(12) United States Patent
Ariga (10) Patent No.: US 10,101,064 B2
(45) Date of Patent: Oct. 16, 2018

(54) AIR CONDITIONER (71) Applicant: SHARP KABUSHIKI KAISHA, Osaka-shi, Osaka (JP)

(72) Inventor: Tohru Ariga, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 902 days.

(21) Appl. No.: 14/381,894

(22) PCT Filed: Jun. 4, 2013

(86) PCT No.: PCT/JP2013/065484
§ 371 (c)(1),
(2) Date: Aug. 28, 2014

(87) PCT Pub. No.: WO2013/183640
PCT Pub. Date: Dec. 12, 2013

(65) Prior Publication Data
US 2015/0040593 A1 Feb. 12, 2015

(30) Foreign Application Priority Data

Jun. 6, 2012 (JP) ................................ 2012-129140

(51) Int. Cl.
*F24F 11/42* (2018.01)
*F25B 29/00* (2006.01)
(Continued)

(52) U.S. Cl.
CPC .......... *F25B 29/003* (2013.01); *F24F 1/0003* (2013.01); *F24F 11/30* (2018.01);
(Continued)

(58) Field of Classification Search
CPC ............ F25D 29/008; F24F 2011/0065; F24F 11/0009; F24F 2110/12; F24F 11/66;
(Continued)

(56) References Cited

U.S. PATENT DOCUMENTS 4,102,389 A * 7/1978 Wills .................. F25B 13/00
165/231
4,254,633 A * 3/1981 Murakami ........... F24F 11/0009
62/155
(Continued)

FOREIGN PATENT DOCUMENTS

CN 1079043 A 12/1993
CN 202210245 U * 5/2012
(Continued)

OTHER PUBLICATIONS

Ariga, Toru, Air conditioner, Feb. 2011, Espacenet translation (WO 2011010506 (A1)).*
(Continued)

*Primary Examiner* — Frantz Jules
*Assistant Examiner* — Nelson Nieves
(74) *Attorney, Agent, or Firm* — Birch, Stewart, Kolasch & Birch, LLP (57) ABSTRACT

The air conditioner 1 includes an outdoor unit 10 and an indoor unit 30. The outdoor unit 10 includes an outdoor heat exchanger 16, a compressor 12, an outdoor fan 15, a temperature detector 23 for detecting a temperature of the outdoor heat exchanger 16, and a temperature detector 27 for detecting an outdoor temperature. The indoor unit 30 includes an indoor heat exchanger 33 and an indoor fan 32. The air conditioner 1 has a heating operation mode: that is, when the outdoor temperature reaches a predetermined first specified temperature or lower during a heating operation, the air conditioner 1 stops the heating operation and goes to standby, and thereafter, when the outdoor temperature reaches a temperature equal to or higher than a predetermined second specified temperature higher than the first specified temperature, the air conditioner 1 executes a
(Continued)

defrosting operation and subsequently resumes the heating operation.

9 Claims, 6 Drawing Sheets

(51) Int. Cl.
| | | |
|---|---|---|
| F24F 1/00 | (2011.01) | |
| F25D 17/06 | (2006.01) | |
| F25D 21/00 | (2006.01) | |
| F25B 13/00 | (2006.01) | |
| F25B 47/02 | (2006.01) | |
| F24F 11/30 | (2018.01) | |
| F24F 110/00 | (2018.01) | |
| F24F 110/12 | (2018.01) | |

(52) U.S. Cl.
CPC ............ F25B 13/00 (2013.01); F25B 47/025 (2013.01); F25D 17/06 (2013.01); F25D 21/002 (2013.01); *F24F 11/42* (2018.01); *F24F 2110/00* (2018.01); *F24F 2110/12* (2018.01); *F25B 2313/02741* (2013.01); *F25B 2500/31* (2013.01); *F25B 2600/01* (2013.01); *F25B 2700/2103* (2013.01); *F25B 2700/2104* (2013.01); *F25B 2700/2106* (2013.01)

(58) Field of Classification Search
CPC ... F24F 11/41; F25B 2500/31; F25B 2347/02; F25B 47/02
USPC .......................................... 62/156, 155, 151
See application file for complete search history.

(56) References Cited

U.S. PATENT DOCUMENTS

| | | | | | |
|---|---|---|---|---|---|
| 4,530,217 | A | * | 7/1985 | Alluto | F25D 21/002 62/154 |
| 5,186,386 | A | * | 2/1993 | Lynch | F23N 5/203 236/11 |
| 5,379,606 | A | * | 1/1995 | Katsuki | F24F 3/065 62/126 |
| 5,801,632 | A | * | 9/1998 | Opal | H04M 11/04 340/585 |
| 5,832,735 | A | * | 11/1998 | Matsumoto | F24F 11/02 62/151 |
| 6,742,349 | B1 | * | 6/2004 | Kawai | G01K 1/026 165/207 |
| 7,856,836 | B2 | * | 12/2010 | Aoki | F25B 47/025 62/140 |
| 8,584,476 | B2 | * | 11/2013 | Kim | F24F 11/0086 62/154 |
| 2002/0017107 | A1 | * | 2/2002 | Bailey | F24F 3/001 62/238.7 |
| 2007/0144191 | A1 | * | 6/2007 | Viegas | F25D 29/001 62/185 |
| 2010/0126191 | A1 | * | 5/2010 | Han | F25D 21/02 62/80 |
| 2010/0218528 | A1 | * | 9/2010 | Yakumaru | F25B 47/022 62/234 |
| 2011/0016896 | A1 | * | 1/2011 | Oomura | B60H 1/00785 62/155 |
| 2011/0154844 | A1 | * | 6/2011 | Lee | F25B 7/00 62/278 |
| 2011/0296861 | A1 | * | 12/2011 | Honda | F24D 3/08 62/238.7 |
| 2012/0227431 | A1 | * | 9/2012 | Wang | B60H 1/00921 62/238.7 |
| 2013/0180269 | A1 | * | 7/2013 | Nagata | F24F 11/0086 62/81 |
| 2016/0153695 | A1 | * | 6/2016 | Hamamoto | B60H 1/00921 62/140 |

FOREIGN PATENT DOCUMENTS

| | | | |
|---|---|---|---|
| JP | 2-85629 A | | 3/1990 |
| JP | 05-346257 A | | 12/1993 |
| JP | 2000172532 A | * | 6/2000 |
| JP | 2004-232942 A | | 8/2004 |
| JP | 4264266 B2 | * | 5/2009 |
| KR | 100318676 B1 | * | 1/2002 |

OTHER PUBLICATIONS

Nishihara, Yoshikazu, Air Conditioner, Jun. 2011, Espacenet Translation (EP 2 330 359 A1).*
International Search Report issued in PCT/JP2013/065484 dated Jul. 9, 2013.

* cited by examiner

FIG.1

HEATING OPERATION

FIG.2

COOLING OPERATION

AIR CONDITIONER

TECHNICAL FIELD

The present invention relates to an air conditioner.

BACKGROUND ART

The mainstream of air conditioners for house use is those adopting the heat pump method and coming in the separate type divided into an outdoor unit and an indoor unit. In this connection, PTL 1 discloses an air conditioner which automatically stops the heating operation when the outdoor temperature becomes extremely low, for example, −15° C. or lower.

In the conventional air conditioner described in PTL 1, when the outdoor temperature has come out of a device-usable temperature range, the compressor and the outdoor fan are stopped while the indoor fan is operated as a circulator. As a result, damage to the compressor and the outdoor heat exchanger can be prevented, and moreover it is designed to achieve improvement in comfortableness by virtue of circulation of the indoor air.

LIST OF CITATIONS

Patent Literature

PTL 1: JP H5-346257 A

SUMMARY OF THE INVENTION

Problem to be Solved by the Invention

As in the above-described conventional air conditioner, in a case where a heating operation is stopped due to an extremely lowered outdoor temperature, when the heating operation is resumed upon an increase in the outdoor temperature that comes within the air conditioner-usable temperature range, it is common practice to immediately start with the heating operation. With an extremely low outdoor temperature, e.g., even in a situation in which there is a fear that heat exchange in the outdoor heat exchanger is blocked from preferably progressing by deposition of snow or frost or the like onto the outdoor heat exchanger of the outdoor unit, the heating operation is continued for a certain time period after the resumption of the heating operation. For example, if a defrosting operation starts immediately after restarting of a heating operation, a user may mistakenly determine that the air conditioner is not operating properly. On the other hand, however, even if a heating operation is performed, an operation that virtually does not contribute to heating is continued, problematically.

Also, since frost is less likely to transform into water under an extremely lowered outdoor temperature, the running time of a defrosting operation may become relatively longer. In many air conditioners, a maximum defrosting operating time is provided to prevent permanently continued execution of the defrosting operation. That is, it is specified that even if defrosting has not been fully completed, a specified time (maximum defrosting operating time) has elapsed from a start of a defrosting operation, the defrosting operation is ended, followed by return to the heating operation. Therefore, there is a problem that under an extremely low outdoor temperature, the defrosting may be ended due to expiration of the maximum defrosting operating time, and results in repetitions of defrosting operations and a heating operation cannot be started for a long period of time.

The present invention having been achieved in view of the above-described problems, an object of the invention is to provide an air conditioner capable of, for resumption of a heating operation that has been stopped due to an extremely lowered outdoor temperature, resuming the heating operation in such a state that enough heating power can be fulfilled.

Means for Solving the Problem

In order to solve the above-described problems, the present invention provides an air conditioner comprising: an outdoor unit and an indoor unit, wherein the outdoor unit includes: an outdoor heat exchanger; a compressor and an outdoor fan both changeable in rotational speed; a temperature detector for detecting a temperature of the outdoor heat exchanger; and a temperature detector for detecting an outdoor temperature, while the indoor unit includes: an indoor heat exchanger; and an indoor fan changeable in rotational speed, whereby the air conditioner is enabled to execute a heating operation toward indoors and a defrosting operation toward the outdoor unit, and wherein the air conditioner has a heating operation mode: that is, when the outdoor temperature reaches a predetermined first specified temperature or lower during a heating operation, the air conditioner stops the heating operation and goes to standby, and thereafter, when the outdoor temperature reaches a temperature equal to or higher than a predetermined second specified temperature higher than the first specified temperature, the air conditioner executes a defrosting operation and subsequently resumes the heating operation.

According to this constitution, when the outdoor temperature reaches the first specified temperature or lower during a heating operation, the air conditioner stops the heating operation and goes to standby. Thereafter, when the outdoor temperature reaches a temperature equal to or higher than the second specified temperature higher than the first specified temperature, the air conditioner executes a defrosting operation and subsequently resumes the heating operation. Executing such a defrosting operation as described above allows the subsequent heating operation to be continued stably.

The above-described terms 'first specified temperature' and 'second specified temperature' refer to predetermined arbitrary outdoor temperatures, i.e., temperatures of the outdoor environment under which the outdoor unit is placed, where those temperatures may be set to such temperatures as −10° C., −12° C., −15° C. and −20° C. The 'first specified temperature' is set to '−15° C.' and the 'second specified temperature' is set to '−12° C.' in later-described embodiments, but those specified temperatures are not limited to such ones. Also, it is assumed that there holds a relationship that 'first specified temperature<second specified temperature.'

The invention also provides an air conditioner comprising: an outdoor unit and an indoor unit, wherein the outdoor unit includes: an outdoor heat exchanger; a compressor and an outdoor fan both changeable in rotational speed; a temperature detector for detecting a temperature of the outdoor heat exchanger; and a temperature detector for detecting an outdoor temperature, while the indoor unit includes: an indoor heat exchanger; and an indoor fan changeable in rotational speed, whereby the air conditioner is enabled to execute a heating operation toward indoors and a defrosting operation toward the outdoor unit, and wherein the air conditioner has a heating operation mode: that is, when a temperature of the outdoor heat exchanger reaches a predetermined defrosting starting temperature during a heating operation so that a defrosting operation is started, the air conditioner ends the defrosting operation and resumes the heating operation on condition that the temperature of the outdoor heat exchanger has reached a predetermined defrosting ending temperature or that defrosting operating time has reached a predetermined maximum defrosting operating time without reaching to the defrosting ending temperature, and when the defrosting operation has reached the maximum defrosting operating time by a specified consecutive number of times, the air conditioner goes to standby without starting the heating operation, and thereafter when the outdoor temperature has increased by a specified temperature increment or more from a temperature at a start of the standby state, the air conditioner executes the defrosting operation and subsequently resumes the heating operation.

According to this constitution, the air conditioner repeats the heating operation and the defrosting operation, and when the defrosting operation has been ended by reaching the maximum defrosting operating time by a specified consecutive number of times (e.g., three consecutive times), the air conditioner goes to standby without starting the heating operation. Thereafter, when the outdoor temperature has increased by a specified temperature increment or more from the temperature at a start of the standby state, the air conditioner executes the defrosting operation and subsequently resumes the heating operation. Executing such a defrosting operation as described above allows the subsequent heating operation to be continued stably.

The above-described terms 'defrosting starting temperature' and 'defrosting ending temperature' refer to predetermined arbitrary temperatures associated with timings for starting and ending the defrosting operation, where those temperatures may be set to such temperatures as 0° C., 1° C. and 10° C. The 'defrosting starting temperature' is set to '0° C.' and the 'defrosting ending temperature' is set to '10° C.' in the later-described embodiments, but those specified temperatures are not limited to such ones. Also, the abovementioned term 'maximum defrosting operating time' refers to a predetermined arbitrary time for limiting the defrosting operating time, and may be set to such a time duration as 9 minutes to 15 minutes. The 'maximum defrosting operating time' is set to '10 minutes' in the later-described embodiments, but such time is not limitative.

In the air conditioner constituted as described above, an ending condition for the defrosting operation to be executed after the standby state in the heating operation mode is a temperature which results when the temperature of the outdoor heat exchanger has increased and which is set lower than a temperature being an ending condition for a normal defrosting operation. According to this constitution, the heating operation is resumed more quickly than the normal defrosting operation.

In the air conditioner constituted as described above, the indoor unit includes notification part for notifying indoors of a state that the outdoor temperature has reached the standby-state temperature or that the outdoor temperature has reached the first specified temperature or lower. According to this constitution, by the notification part such as turning on a low outdoor temperature lamp or producing an alarm sound, the user present indoors is allowed to recognize that the outdoor temperature has become extremely low so that the heating operation has been stopped.

In the air conditioner constituted as described above, the air conditioner further comprises switching part for switching between effective and ineffective state of the heating operation mode. According to this constitution, it becomes easier to select as to which the heating operation mode is turned effective or ineffective.

Advantageous Effects of the Invention

According to the constitution of this invention, the air conditioner stops a heating operation and goes to standby due to an extremely lowered outdoor temperature, after which the resumed heating operation stably continues. Thus, there can be provided an air conditioner capable of, upon resumption of a heating operation stopped due to an extremely lowered outdoor temperature, resuming the heating operation in such a state that enough heating power can be fulfilled.

DESCRIPTION OF EMBODIMENTS

Hereinbelow, embodiments of the present invention will be described with reference to FIGS. 1 to 7.

First Embodiment

Figure 1:
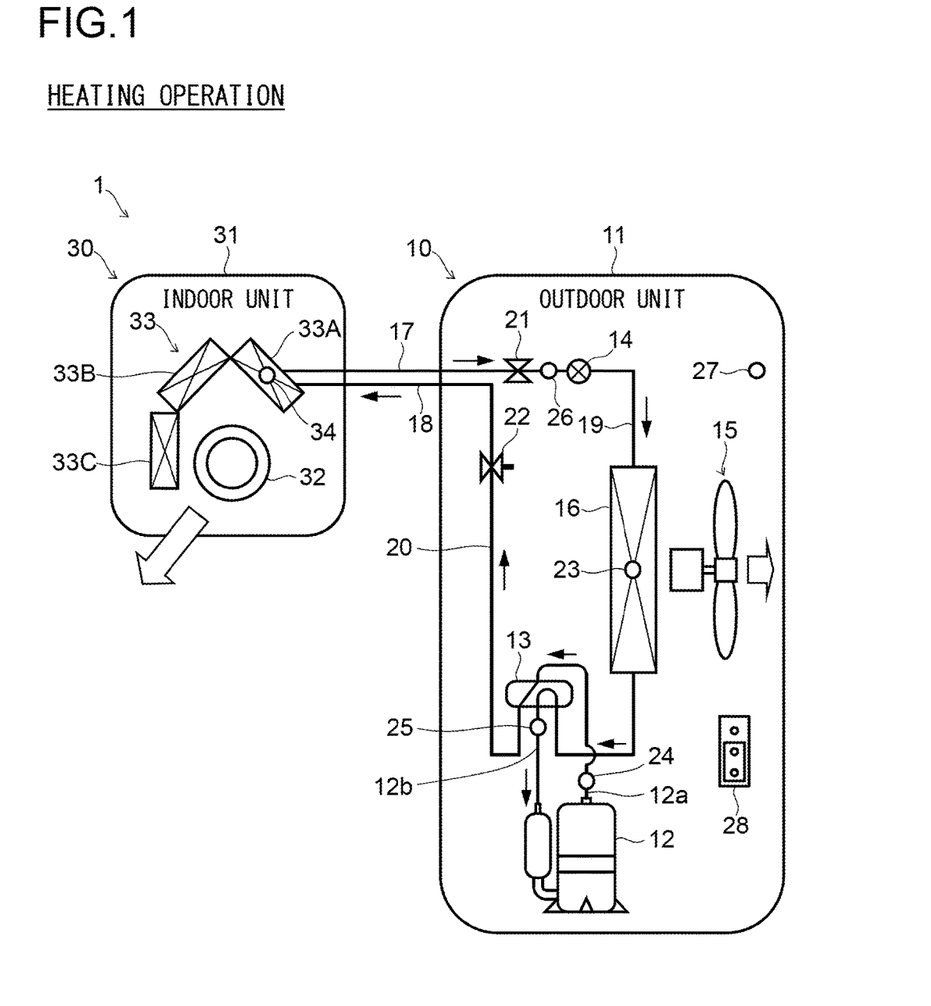
FIG. 1 is a schematic configuration diagram of an air conditioner according to a first embodiment of the invention, showing a state of a heating operation.
Figure 2:
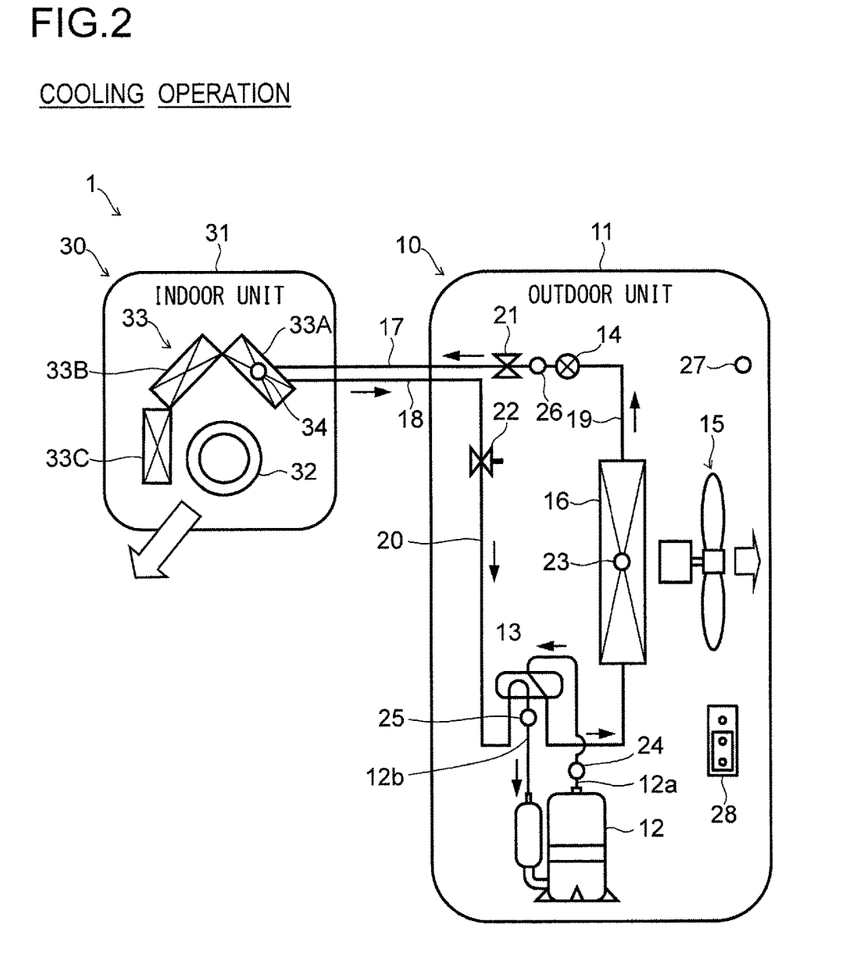
FIG. 2 is a schematic configuration diagram of the air conditioner according to the first embodiment of the invention, showing a state of a cooling operation.
Figure 3:
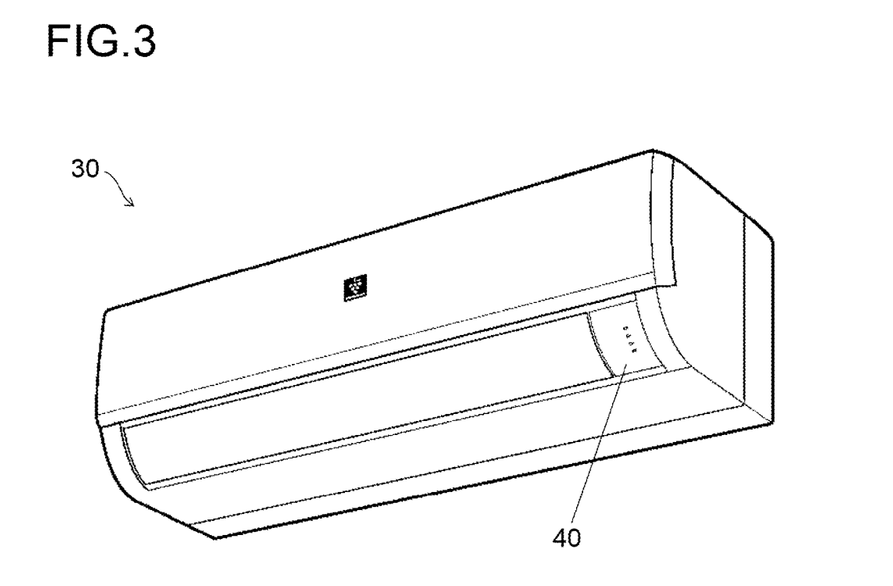
FIG. 3 is an appearance perspective view of an indoor unit of the air conditioner according to the first embodiment of the invention.
Figure 4:
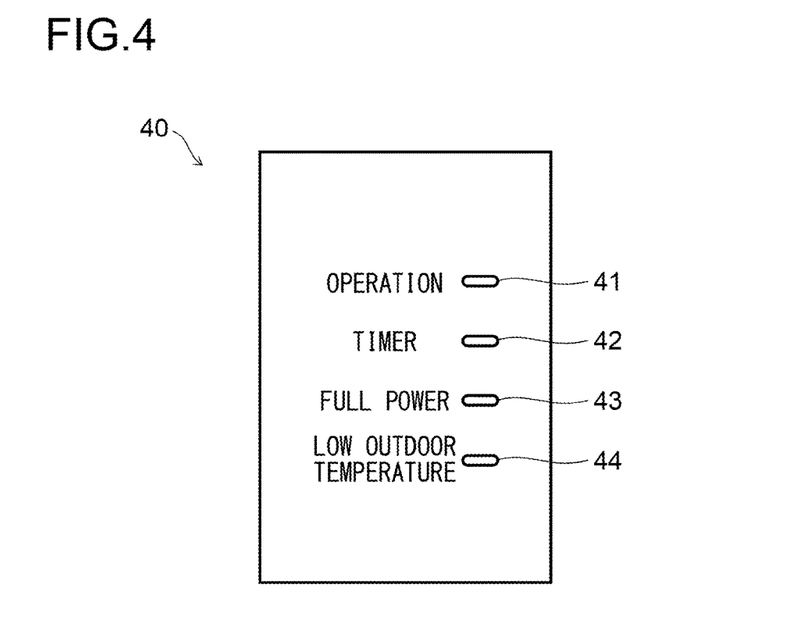
FIG. 4 is a front view of a display part of the indoor unit of the air conditioner according to the first embodiment of the invention.
Figure 5:
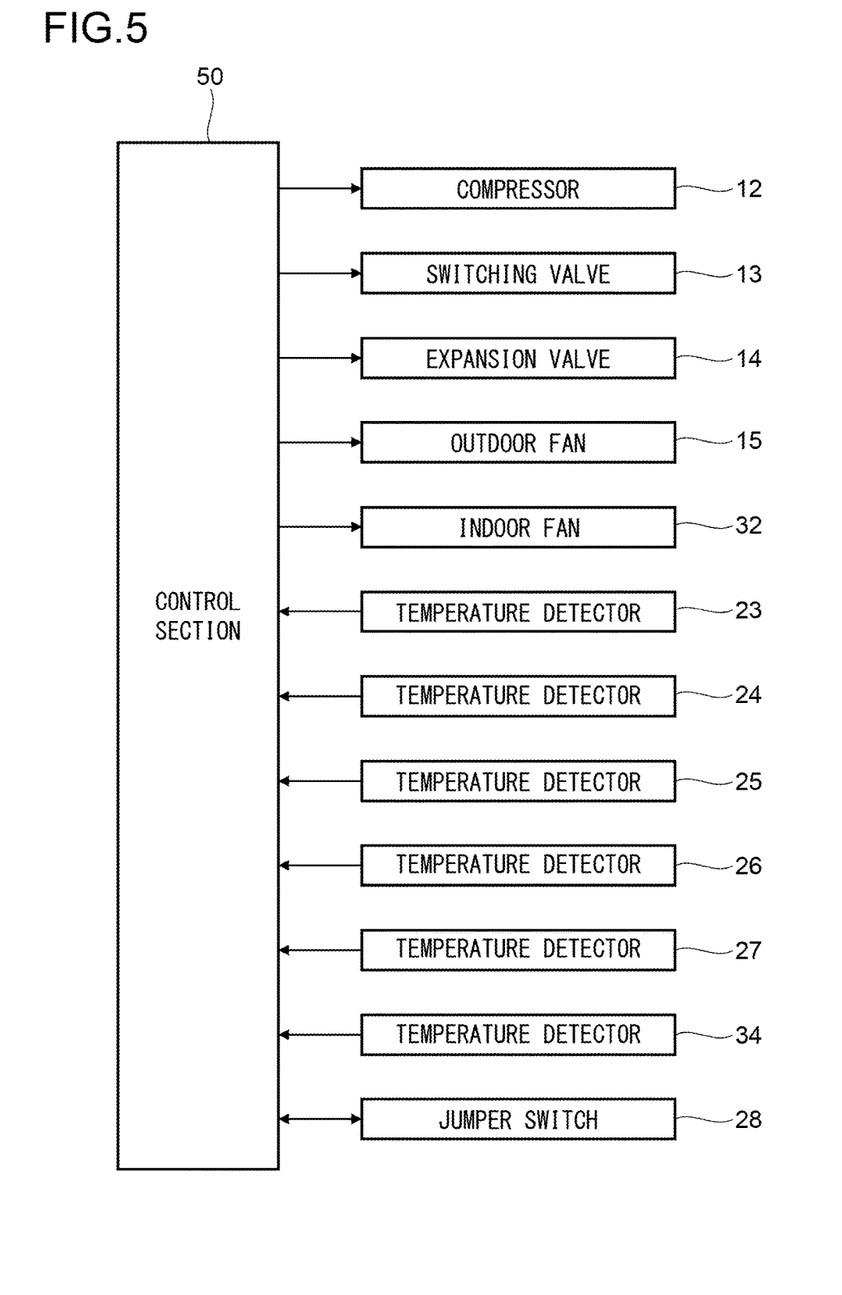
FIG. 5 is a block diagram showing a configuration of the air conditioner according to the first embodiment of the invention.

First, structure and operation of an air conditioner according to a first embodiment of the present invention will be described in outline with reference to FIGS. 1 to 5. FIGS. 1 and 2 are schematic configuration diagrams of the air conditioner, showing its states in a heating operation and a cooling operation, respectively. FIG. 3 is an appearance perspective view of an indoor unit of the air conditioner, FIG. 4 is a front view of a display part of the indoor unit, and FIG. 5 is a block diagram showing a configuration of the air conditioner.

The air conditioner 1, as shown in FIGS. 1 and 2, is a separate type air conditioner composed of an outdoor unit 10 and an indoor unit 30.

The outdoor unit 10, which is to be installed on an outdoor floor surface as an example, includes a rectangular box-shaped casing 11 composed of a synthetic resin component and a sheet metal component. Housed inside the casing 11 are a compressor 12, a switching valve 13, an expansion valve 14, an outdoor fan 15, an outdoor heat exchanger 16, and the like.

The switching valve 13 is a four-way valve for switching a flow direction of a refrigerant among various operation modes such as heating operation and cooling operation. The expansion valve 14 is an openness-controllable one.

The outdoor fan 15 is a combination of a propeller fan provided next to an inner wall of the casing 11 and a motor for rotating the propeller fan. The casing 11 is provided with a suction port and a blowoff port which are not shown. The outdoor heat exchanger 16 is placed in proximity to the outdoor fan 15. As the outdoor fan 15 is driven, outside air sucked from outside through the suction port into the casing 11 passes through the outdoor heat exchanger 16, by which heat exchange is performed between the outdoor heat exchanger 16 and the outside air.

The outdoor unit 10 is connected to the indoor unit 30 with two refrigerant pipes 17, 18. The refrigerant pipe 17, through which a liquid refrigerant flows, is a thinner pipe in comparison to the refrigerant pipe 18. Therefore, the refrigerant pipe 17 may be designated as, for example, 'liquid pipe,' 'thin pipe' or the like. The refrigerant pipe 18, through which a gaseous refrigerant flows, is a thick pipe in comparison to the refrigerant pipe 17. Therefore, refrigerant pipe 18 may be designated as, for example, 'gas pipe,' 'thick pipe' or the like. The refrigerant is given by use of, for example, HFC-related R410A, R32, or the like.

With regard to refrigerant pipes 19, 20 inside the outdoor unit 10, a two-way valve 21 is provided on the refrigerant pipe 19 connected to the refrigerant pipe 17, and a three-way valve 22 is provided on the refrigerant pipe 20 connected to the refrigerant pipe 18. When the refrigerant pipes 17, 18 are removed from the outdoor unit 10, the two-way valve 21 and the three-way valve 22 are closed so as to prevent the refrigerant from leaking outside from the outdoor unit 10. When collection of the refrigerant from the outdoor unit 10 or from the whole air conditioner 1 is necessary, the refrigerant is collected through the three-way valve 22.

The indoor unit 30, which is to be installed near a ceiling on an indoor wall surface as an example, includes a casing 31 formed into a horizontally-extending oblong shape and made from a synthetic resin component as shown in FIG. 3. Housed inside the casing 31 are an indoor fan 32, an indoor heat exchanger 33 and the like shown in FIGS. 1 and 2.

The indoor fan 32 is a combination of a cross flow fan horizontally extending in an oblong form along the shape of the casing 31, and a motor for rotating the cross flow fan. The casing 31 is provided with a suction port and a blowoff port which are not shown. The indoor heat exchanger 33, as in the case of the cross flow fan, extends horizontally and is made by a combination of three units (indoor heat exchangers 33A, 33B, 33C). The three-unit indoor heat exchanger 33 is placed so as to cover upper portion and front portion of the cross flow fan of the indoor fan 32. As the indoor fan 32 is driven, indoor air sucked through the suction port into the casing 31 passes through the indoor heat exchanger 33, by which heat exchange between the indoor heat exchanger 33 and the indoor air is performed.

On the front surface of the indoor unit 30, a display part 40 is placed as shown in FIGS. 3 and 4. Provided in the display part 40 are an 'OPERATION' lamp 41, a 'TIMER' lamp 42, a 'FULL POWER' lamp 43, and a 'LOW OUTDOOR TEMPERATURE' lamp 44, which are implemented by, for example, LEDs (Light Emitting Diodes) of individually different colors. These lamps are turned on, i.e. lit, when the air conditioner 1 comes to their corresponding operating state.

The 'OPERATION' lamp 41 is lit while the air conditioner 1 is in operation. The 'TIMER' lamp 42 is lit on condition that an ON-timer mode for automatic starting of operation at a reserved time or an OFF-timer mode for automatic stopping of operation at a reserved time is set. The 'FULL POWER' lamp 43 is lit while the air conditioner 1 is operating in the full power state. The 'LOW OUTDOOR TEMPERATURE' lamp 44, which is a notification part, will be described later.

For fulfilling operational control over the air conditioner 1, it is essential to get notified of temperatures at various points. Therefore, temperature detectors are set in the outdoor unit 10 and the indoor unit 30.

In the outdoor unit 10, a temperature detector 23 is set on the outdoor heat exchanger 16, a temperature detector 24 is set on a discharge pipe 12a serving as a discharge part of the compressor 12, a temperature detector 25 is set on a suction pipe 12b serving as a suction part of the compressor 12, a temperature detector 26 is set on the refrigerant pipe 19 between the expansion valve 14 and the two-way valve 21, and a temperature detector 27 for outdoor temperature detection is set at a specified point inside the casing 11. In the indoor unit 30, a temperature detector 34 is set on the indoor heat exchanger 33. The temperature detectors 23, 24, 25, 26, 27, 34 are implemented each by a thermistor as an example.

In the indoor unit 30, the casing 31 contains a control section or control 50 shown in FIG. 5 for fulfilling operational control over the whole air conditioner 1 including the outdoor unit 10. The control section 50 includes an arithmetic part, a storage part and the like, which are not shown, so as to implement a sequence of air-conditioning operations for fulfilling such control that the indoor temperature reaches a target value set by the user, based on programs and data stored and inputted in the storage part or the like.

The control section 50 issues operational instructions to the compressor 12, the switching valve 13, the expansion valve 14, the outdoor fan 15 and the indoor fan 32. Also, the control section 50 receives output signals of individual detected temperatures from the temperature detectors 23 to 27 and the temperature detector 34. By referencing the output signals from the temperature detectors 23 to 27 and the temperature detector 34, the control section 50 issues operational instructions to the compressor 12, the outdoor fan 15 and the indoor fan 32, and moreover issues switching instructions to the switching valve 13 and the expansion valve 14.

FIG. 1 shows a state in which the air conditioner 1 is executing a heating operation. In this case, the compressor 12 circulates the refrigerant in heating circulation, which is a circulation fashion that the refrigerant discharged from the compressor 12 first enters the indoor heat exchanger 33. The refrigerant is circulated along a direction depicted by arrows in proximities to the refrigerant pipes 17 to 20 or the like in FIG. 1.

The high-temperature, high-pressure gaseous refrigerant discharged from the compressor 12 enters the indoor heat exchanger 33, where heat exchange with the indoor air is performed. The refrigerant radiates heat to the indoor air, by which the indoor air is heated. The refrigerant that has undergone heat radiation and condensation so as to be liquefied is reduced in pressure on the way from the indoor heat exchanger 33 to the expansion valve 14. The pressure-reduced refrigerant is fed to the outdoor heat exchanger 16 and expanded to be low in temperature and low in pressure, causing the surface temperature of the outdoor heat exchanger 16 to lower. The outdoor heat exchanger 16 having its surface temperature lowered absorbs heat from outside air. After the heat absorption, the low-temperature gaseous refrigerant returns to the compressor 12. An air stream generated by the indoor fan 32 accelerates heat radiation from the indoor heat exchanger 33 while an air stream generated by the outdoor fan 15 accelerates heat absorption by the outdoor heat exchanger 16.

FIG. 2 shows a state in which the air conditioner 1 is performing a cooling operation or a defrosting operation. In this case, the switching valve 13 is switched over so that the flow of the refrigerant is reversed to that of the heating operation. The compressor 12 circulates the refrigerant in cooling circulation, which is a circulation fashion that the refrigerant discharged from the compressor 12 first enters the outdoor heat exchanger 16. The refrigerant is circulated along a direction depicted by arrows in proximities to the refrigerant pipes 17 to 20 or the like in FIG. 2.

The high-temperature, high-pressure gaseous refrigerant discharged from the compressor 12 enters the outdoor heat exchanger 16, where heat exchange with the outside air is performed. The refrigerant radiates heat to the outdoor air, being condensed. The condensed and liquefied refrigerant is reduced in pressure on the way from the outdoor heat exchanger 16 to the expansion valve 14. The pressure-reduced refrigerant is fed to the indoor heat exchanger 33 and expanded to be low in temperature and low in pressure, causing the surface temperature of the indoor heat exchanger 33 to lower. The indoor heat exchanger 33 having its surface temperature lowered absorbs heat from the indoor air, by which the indoor air is cooled. After the heat absorption, the low-temperature gaseous refrigerant returns to the compressor 12. An air stream generated by the outdoor fan 15 accelerates heat radiation from the outdoor heat exchanger 16 while an air stream generated by the indoor fan 32 accelerates heat absorption by the indoor heat exchanger 33.

In the defrosting operation, the indoor fan 32 does not operate, so that heat exchange by the air stream is not aggressively executed on the indoor side. During a heating operation, when the temperature of the outdoor heat exchanger 16 detected by the temperature detector 23 reaches a predetermined defrosting starting temperature, e.g. 0° C., the air conditioner 1 starts the defrosting operation. Meanwhile, when the temperature of the outdoor heat exchanger 16 reaches a predetermined defrosting ending temperature, e.g. 10° C., the air conditioner 1 ends the defrosting operation. Also when the defrosting operating time reaches a predetermined maximum defrosting operating time, e.g. 10 minutes, without reaching of the temperature of the outdoor heat exchanger to the defrosting ending temperature, the air conditioner 1 ends the defrosting operation.

During the heating operation, when the outdoor temperature detected by the temperature detector 27 becomes extremely low, e.g. −15° C. or lower, the air conditioner 1 once stops the heating operation automatically. Thereafter, when the outdoor temperature increases to within an air conditioner-usable temperature range so that the heating operation is resumed, the air conditioner 1 first executes a defrosting operation and subsequently resumes the heating operation. This is a heating operation mode of the air conditioner 1.

With regard to this heating operation mode, for example, when the outdoor temperature reaches a predetermined first specified temperature, e.g. −15° C. or lower, during the heating operation, the air conditioner stops the heating operation and goes to a standby state thereby entering an ineffective state. Thereafter, when the outdoor temperature increases so as to reach a predetermined second specified temperature which is higher than the first specified temperature and which is e.g. −12° C. or higher, then the air conditioner executes the defrosting operation and subsequently resumes the heating operation, thereby entering an effective state. When the outdoor temperature becomes −15° C. or lower so that the air conditioner stops the heating operation and goes to the standby state, the 'LOW OUTDOOR TEMPERATURE' lamp 44 is lit indoors to notify of that state.

In this case, the ending condition for the defrosting operation to be executed after the standby state is set to 1° C., which is an increased temperature of the outdoor heat exchanger 16 and which is lower than the temperature (10° C.) that is the ending condition for a normal defrosting operation.

A jumper switch 28 which is a switching part for switching between effective and ineffective state of the heating operation mode as described above is provided in the outdoor unit 10. In addition, instead of the jumper switch, such a switch component as a DIP switch may be used as the switching part for switching between effective and ineffective state of the heating operation mode. Also, the switching part is not limited to mechanical components, and software-based switching such as programs (e.g., ON/OFF of flags) may be used for the switching.

Figure 6:
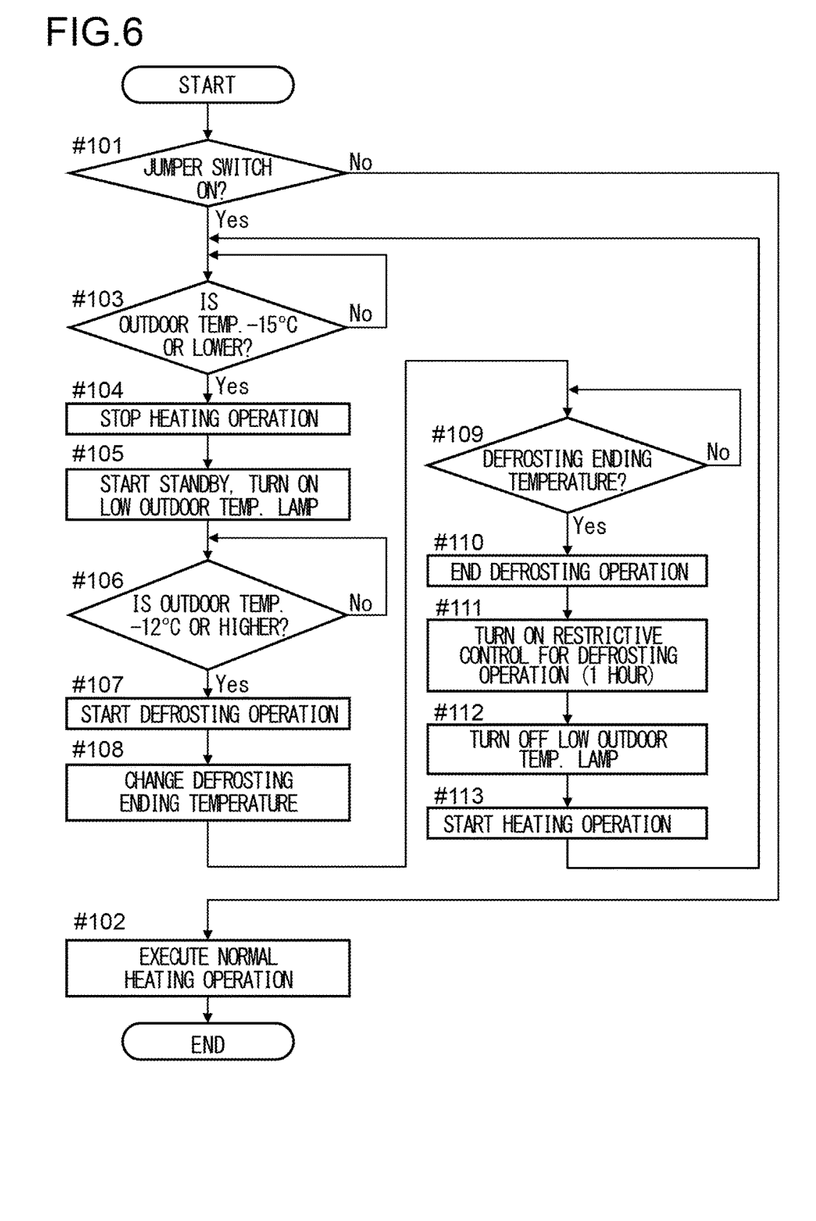
FIG. 6 is a flowchart showing an operation flow of a heating operation in the air conditioner according to the first embodiment of the invention.

Next, the operational flow during the heating operation of the air conditioner 1 is explained along with the flow shown in FIG. 6. FIG. 6 is a flowchart showing an operation flow of a heating operation in the air conditioner 1.

As the heating operation is started in the air conditioner 1 (Start in FIG. 6), the control section 50 decides whether or not the jumper switch 28 is ON (step #101 in FIG. 6). If the jumper switch 28 is OFF (No at step #101), then the control section 50 executes a normal heating operation (step #102). That is, the air conditioner 1 does not execute a heating operation mode for the case of an extremely lowered outdoor temperature as described above. In addition, both the normal heating operation and the heating operation mode for the case of an extremely lowered outdoor temperature are ended by the user's manual stopping or by an automatic stop in the OFF-timer mode (End in FIG. 6).

On the other hand, if the jumper switch 28 is ON (Yes at step #101), then the control section 50 decides, based on temperature information derived from the temperature detector 27, whether or not the outdoor temperature is −15° C. or lower (step #103). Unless the outdoor temperature becomes −15° C. or lower, the air conditioner 1 continues the heating operation (No at step #103).

When the outdoor temperature becomes −15° C. or lower (Yes at step #103), the control section 50 stops the heating operation (step #104) and starts to stand by, being in the standby state, so that the 'LOW OUTDOOR TEMPERATURE' lamp 44 is lit (step #105).

Subsequently, based on temperature information derived from the temperature detector 27, the control section 50 decides whether or not the outdoor temperature has reached −12° C. or higher (step #106). Unless the outdoor temperature becomes −12° C. or higher, the air conditioner 1 continues the standby state (No at step #106).

If the outdoor temperature has reached −12° C. or higher (Yes at step #106), then the control section 50 starts a defrosting operation (step #107). In this case, the control section 50 sets the defrosting ending temperature to 1° C., which is lower than the normal-defrosting-operation ending temperature (10° C.) (step #108).

Subsequently, based on temperature information derived from the temperature detector 23, the control section 50 decides whether or not the temperature of the outdoor heat exchanger 16 has reached the defrosting ending temperature of 1° C. (step #109). Unless the temperature of the outdoor heat exchanger 16 reaches the defrosting ending temperature of 1° C., the air conditioner 1 continues the defrosting operation (No at step #109).

When the temperature of the outdoor heat exchanger 16 reaches the defrosting ending temperature of 1° C. (Yes at step #109), then the control section 50 ends the defrosting operation (step #110). The control section 50 turns ON restriction control for the defrosting operation (step #111). In this case, the restriction time is set to 1 hour as an example, and for a period of the subsequent 1 hour, the restriction control for suppressing the execution of the defrosting operation is performed.

Then, the control section 50 turns off the 'LOW OUTDOOR TEMPERATURE' lamp 44 (step #112) and starts a heating operation (step #113). Thereafter, the processing flow returns to step #103, where it is continued to monitor whether or not the outdoor temperature has reached −15° C. or lower.

As described above, the air conditioner 1 has the heating operation mode: that is, when the outdoor temperature reaches a predetermined first specified temperature (e.g. −15° C.) or lower during a heating operation, the air conditioner 1 once stops the heating operation and goes to standby, and thereafter, when the outdoor temperature reaches a predetermined second specified temperature (e.g. −12° C.) or higher, the air conditioner 1 executes a defrosting operation and subsequently resumes the heating operation. Executing such a defrosting operation makes it possible to stably continue the subsequent heating operation.

Also, the ending condition for the defrosting operation to be executed after the standby state in the heating operation mode is a temperature at a time when the temperature of the outdoor heat exchanger 16 has increased, the temperature being set to a temperature (e.g. 1° C.) lower than the temperature that is the normal-defrosting-operation ending condition (e.g. 10° C.). As a result of this, it becomes possible to resume the heating operation more quickly than in the normal defrosting operation.

Further, since the indoor unit 30 includes the 'LOW OUTDOOR TEMPERATURE' lamp 44 for lighting indoors to notify that the outdoor temperature has reached a temperature that causes the air conditioner 1 to go to standby, it is possible for the user present indoors to recognize that the outdoor temperature has become extremely low so that the heating operation has been stopped. Therefore, the user can be prevented from making the mistake of a failure of the air conditioner 1.

Also, since the jumper switch 28 for switching between effective and ineffective state of the heating operation mode is provided in the outdoor unit 10, it becomes easier to select as to which the heating operation mode is turned effective or ineffective. Therefore, the effective and ineffective state of the heating operation mode can be switched over in response to the environment under which the air conditioner 1 is installed.

According to the constitution of this embodiment of the invention, the air conditioner 1 once stops the heating operation and goes to a standby state due to an extremely lowered outdoor temperature, and thereafter, when the outdoor temperature has increased to within an air conditioner-usable temperature range, the heating operation is resumed and subsequently stably continued. Thus, there can be provided an air conditioner 1 capable of, upon resumption of a once-stopped heating operation due to an extremely lowered outdoor temperature, resuming the heating operation in such a state that enough heating power can be fulfilled.

Second Embodiment

Figure 7:
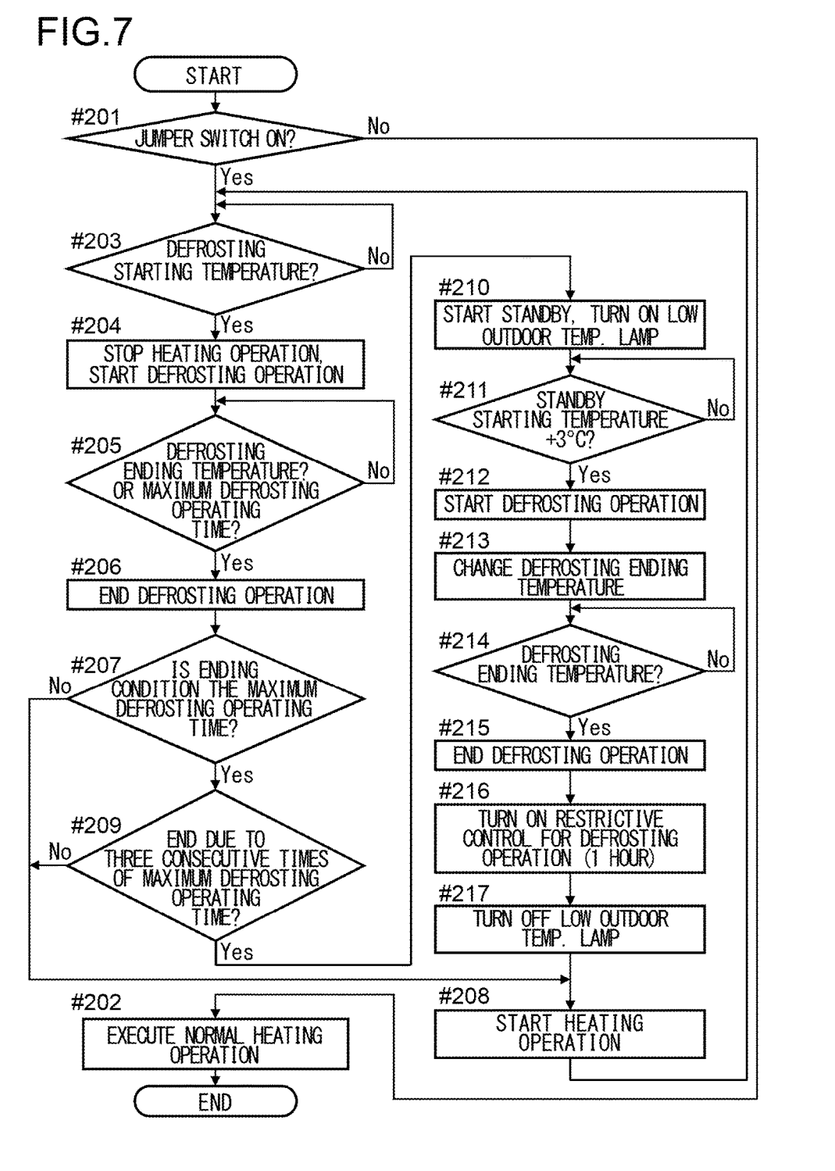
FIG. 7 is a flowchart showing an operation flow of a heating operation in an air conditioner according to a second embodiment of the invention.

Next, an air conditioner according to a second embodiment of the invention will be described with reference to FIG. 7. FIG. 7 is a flowchart showing an operation flow of a heating operation in the air conditioner. In addition, a basic constitution of this embodiment is similar to that of the first embodiment described with reference to FIGS. 1 to 6. Therefore, constituent members common to the first embodiment are designated by like reference signs, and their depiction in the drawings as well as their description are omitted.

The air conditioner 1 of the second embodiment, as in the first embodiment, has a heating operation mode: that is, when the outdoor temperature becomes extremely low, the air conditioner once stops the heating operation automatically, and thereafter upon resumption of the heating operation, the air conditioner first executes a defrosting operation and subsequently resumes the heating operation. However, an extremely lowered outdoor temperature is discriminated not by using the temperature detector 27 but by detecting a state in which the heating operation and the defrosting operation are repeated.

In this heating operation mode, for example, when the temperature of the outdoor heat exchanger 16 has reached a predetermined defrosting starting temperature, e.g. 0° C., during a heating operation so that the defrosting operation is started, the air conditioner 1 ends the defrosting operation and resumes the heating operation on condition that the temperature of the outdoor heat exchanger 16 reaches a predetermined defrosting ending temperature, e.g. 10° C., or that the defrosting operating time has reached a predetermined maximum defrosting operating time, e.g. 10 minutes, without reaching to the defrosting ending temperature, and moreover when the defrosting operation is ended as a result of reaching the maximum defrosting operating time by a specified consecutive number of times, e.g. three consecutive times, the air conditioner 1 goes to standby without starting the heating operation, and thereafter, executes a defrosting operation and subsequently resumes the heating operation on condition that the outdoor temperature has increased by specified temperature increment, e.g. 3° C. or more, over a temperature at the start of the above-mentioned standby state.

The air conditioner 1 as described above executes the heating operation according to the operational flow shown in FIG. 7.

In the air conditioner 1, as the heating operation is started (Start in FIG. 7), the control section 50 decides whether or not the jumper switch 28 is ON (step #201 in FIG. 7). If the jumper switch 28 is ON (Yes at step #201), then the control section 50 decides, based on temperature information derived from the temperature detector 23, whether or not the temperature of the outdoor heat exchanger 16 has reached the defrosting starting temperature (0° C.) (step #203). Unless the temperature of the outdoor heat exchanger 16 becomes the defrosting starting temperature (0° C.), the air conditioner 1 continues the heating operation (No at step #203).

When the temperature of the outdoor heat exchanger 16 has reached the defrosting starting temperature (0° C.) (Yes at step #203), the control section 50 stops the heating operation and starts the defrosting operation (step #204).

Subsequently, based on temperature information derived from the temperature detector 23, the control section 50 decides whether or not the temperature of the outdoor heat exchanger 16 has reached the defrosting ending temperature (10° C.) or whether or not the defrosting operating time has reached the maximum defrosting operating time (10 minutes) without reaching of the temperature of the outdoor heat exchanger 16 to the defrosting ending temperature (step #205). Unless the temperature of the outdoor heat exchanger 16 reaches the defrosting ending temperature (10° C.) or unless the defrosting operating time reaches the maximum defrosting operating time (10 minutes), the air conditioner 1 continues the defrosting operation (No at step #205).

If the temperature of the outdoor heat exchanger 16 has reached the defrosting ending temperature (10° C.) or if the defrosting operating time has reached the maximum defrosting operating time (10 minutes) (Yes at step #205), then the control section 50 ends the defrosting operation (step #206). Then, the control section 50 decides whether or not the defrosting-operation ending condition is the maximum defrosting operating time (step #207). If the defrosting-operation ending condition is not the maximum defrosting operating time (No at step #207), then the control section 50 resets the consecutive number of times for ending of the defrosting operation, which is conditioned by the maximum defrosting operating time, to 0 times, and starts the heating operation (step #208), followed by returning again to step #203.

If the defrosting-operation ending condition is the maximum defrosting operating time (Yes at step #207), then the control section 50 decides whether or not the defrosting operation has been ended by three consecutive times of reaching to the maximum defrosting operating time (step #209). In addition, in connection to this point, each time a defrosting operation is ended, the control section 50 stores an ending condition for the defrosting operation and a number of ending times in association with the defrosting operation. If the number of ending times for a defrosting operation conditioned by the maximum defrosting operating time is less than 3 consecutive times (No at step #209), then the control section 50 starts a heating operation (step #208), followed by returning again to step #203.

If the defrosting operation has been ended by three consecutive times of reaching to the maximum defrosting operating time (Yes at step #209), then the control section 50 starts to stand by so as to be in a standby state, making the 'LOW OUTDOOR TEMPERATURE' lamp 44 turned on, or lit (step #210). In this case, the control section 50 stores an outdoor temperature at the time of standby start based on temperature information derived from the temperature detector 27.

Subsequently, based on temperature information derived from the temperature detector 27, the control section 50 decides whether or not the outdoor temperature has reached an increment of +3° C. relative to the outdoor temperature at the time of standby start (step #211). Unless the outdoor temperature reaches the temperature of standby-start outdoor temperature+3° C., the air conditioner 1 continues the standby state (No at step #211).

If the outdoor temperature has reached the temperature of standby-start outdoor temperature+3° C. (Yes at step #211), then the control section 50 starts a defrosting operation (step #212). Also, at step #212, the control section 50 resets the consecutive number of defrosting-operation ending times, which is conditioned by the maximum defrosting operating time, to 0 times. In this case, the control section 50 sets the defrosting ending temperature to 1° C., which is lower than the normal-defrosting-operation ending temperature (10° C.) (step #213). In addition, processing flows from this step up to steps #217 and #208 are identical to those up to steps #109 to #113 in FIG. 4 described in the first embodiment, and therefore their detailed description is omitted here.

As described above, this air conditioner 1 has the heating operation mode: that is, when the temperature of the outdoor heat exchanger 16 has reached a predetermined defrosting starting temperature (e.g. 0° C.) during a heating operation so that the defrosting operation is started, the air conditioner 1 ends the defrosting operation and resumes the heating operation on condition that the temperature of the outdoor heat exchanger 16 reaches a predetermined defrosting ending temperature (e.g. 10° C.) or that the defrosting operating time has reached a predetermined maximum defrosting operating time (e.g. 10 min.) without reaching to the defrosting ending temperature, and moreover when the defrosting operation is ended as a result of reaching the maximum defrosting operating time by a specified consecutive number of times (e.g. three consecutive times), the air conditioner 1 goes to standby without starting the heating operation, and thereafter, executes a defrosting operation and subsequently resumes the heating operation on condition that the outdoor temperature increases by a specified temperature increment (e.g. 3° C.) or more over a temperature at the time of the standby start. Executing such a defrosting operation as described above makes it possible to continue the subsequent heating operation stably.

Whereas embodiments of the invention have been described hereinabove, the invention is not limited to those embodiments and may be carried out with changes and modifications made in various ways without departing from the spirit of the invention.

For example, the notification part may be implemented by producing an alarm sound other than turning on the low outdoor temperature lamp.

INDUSTRIAL APPLICABILITY

The present invention is applicable to air conditioners including an outdoor unit and an indoor unit.

LIST OF REFERENCE SIGNS

1 air conditioner
10 outdoor unit
12 compressor
15 outdoor fan
16 outdoor heat exchanger
23, 24, 25, 26, 27 temperature detector
28 jumper switch (switching part)
30 indoor unit
32 indoor fan
33 indoor heat exchanger
34 temperature detector
40 display part
44 'LOW OUTDOOR TEMPERATURE' lamp (notification part)
50 control section

The invention claimed is:

1. An air conditioner comprising an outdoor unit and an indoor unit, wherein the outdoor unit includes: an outdoor heat exchanger; a compressor and an outdoor fan both changeable in rotational speed; a switching valve that switches a flow direction of a refrigerant to switch operation modes of the air conditioner between a heating operation and a cooling operation or a defrosting operation; a temperature detector for detecting a temperature of the outdoor heat exchanger; and a temperature detector for detecting an outdoor temperature, while the indoor unit includes: an indoor heat exchanger; and an indoor fan changeable in rotational speed, whereby the air conditioner is enabled to execute the heating operation toward indoors and the defrosting operation toward the outdoor unit, and wherein the air conditioner further comprises a control which controls the air conditioner in a heating operation mode in which the air conditioner performs the heating operation, so that, when the outdoor temperature falls to or below a predetermined first specified temperature during the heating operation, the control controls the air conditioner to stop the heating operation and go to standby, and thereafter, when, during the standby, if the outdoor temperature reaches a temperature equal to or higher than a predetermined second specified temperature higher than the first specified temperature, the controller controls the air conditioner to switch the switching valve and execute the defrosting operation and subsequently controls the air conditioner to switch the switching valve and resume the heating operation.

2. An air conditioner comprising an outdoor unit and an indoor unit, wherein the outdoor unit includes: an outdoor heat exchanger; a compressor and an outdoor fan both changeable in rotational speed; a switching valve that switches a flow direction of a refrigerant to switch operation modes of the air conditioner between a heating operation and a cooling operation or a defrosting operation; a temperature detector for detecting a temperature of the outdoor heat exchanger; and a temperature detector for detecting an outdoor temperature, while the indoor unit includes: an indoor heat exchanger; and an indoor fan changeable in rotational speed, whereby the air conditioner is enabled to execute the heating operation toward indoors and the defrosting operation toward the outdoor unit, and wherein the air conditioner further comprises a control which controls the air conditioner in a heating operation mode in which the air conditioner performs the heating operation, where, so that, when a temperature of the outdoor heat exchanger reaches a predetermined defrosting starting temperature during the heating operation, the control controls the air conditioner so that the switching valve is switched and the defrosting operation is started, the control further controlling the air conditioner to end the defrosting operation, switch the switching valve and resume the heating operation on condition that the temperature of the outdoor heat exchanger has reached a predetermined defrosting ending temperature or that a predetermined maximum defrosting operating time has been reached without reaching to the defrosting ending temperature, and when a number of consecutive defrosting operations that have reached the maximum defrosting operating time exceeds by a specified number of times, the control further controlling the air conditioner go to standby without starting the heating operation, and thereafter when, during the standby, the outdoor temperature has increased by a specified temperature increment or more from a temperature at a start of the standby state, the control controls the air conditioner to switch the switching valve, execute the defrosting operation and subsequently resume the heating operation.

3. The air conditioner as claimed in claim 1, wherein the control determines an ending condition for the defrosting operation to be executed after the standby state in the heating operation mode when the temperature of the outdoor heat exchanger has increased, the ending condition being created when a set temperature is reached which is set lower than a temperature being an ending condition for a normal defrosting operation.

4. The air conditioner as claimed in claim 1, wherein the indoor unit includes a notifier that notifies indoors of a state that the outdoor temperature has reached the standby-state temperature.

5. The air conditioner as claimed in claim 1, wherein the indoor unit includes a notifier that notifies indoors of a state that the outdoor temperature has become a temperature equal to or lower than the first specified temperature.

6. The air conditioner as claimed in claim 1, wherein the control further includes a switch that switches between effective and ineffective state of the heating operation mode.

7. The air conditioner as claimed in claim 2, wherein for the control ends the defrosting operation executed after the standby state in the heating operation mode when a temperature is reached which results when the temperature of the outdoor heat exchanger has increased and which temperature is set lower than a temperature defining an ending condition for a normal defrosting operation.

8. The air conditioner as claimed in claim 2, wherein the indoor unit includes a notifier that notifies indoors of a state that the outdoor temperature has reached the standby-state temperature.

9. The air conditioner as claimed in claim 2, further comprising a switch that switches between effective and ineffective state of the heating operation mode.

* * * * *